(12) United States Patent
Yoon et al.

(10) Patent No.: US 11,397,488 B2
(45) Date of Patent: Jul. 26, 2022

(54) TOUCH SENSOR

(71) Applicant: DONGWOO FINE-CHEM CO., LTD., Iksan-si (KR)

(72) Inventors: Ju In Yoon, Pyeongtaek-si (KR); Sungwoo Yu, Hwaseong-si (KR); Gun Young Lee, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 17/210,640

(22) Filed: Mar. 24, 2021

(65) Prior Publication Data
US 2021/0303123 A1 Sep. 30, 2021

(30) Foreign Application Priority Data

Mar. 26, 2020 (KR) .................. 10-2020-0036745

(51) Int. Cl.
*G06F 3/041* (2006.01)
*G06F 3/044* (2006.01)
*G02B 5/30* (2006.01)

(52) U.S. Cl.
CPC .......... *G06F 3/04164* (2019.05); *G06F 3/044* (2013.01); *G02B 5/30* (2013.01); *G06F 2203/04102* (2013.01)

(58) Field of Classification Search
CPC ............... G06F 3/04164; G06F 3/044; G06F 2203/04102; G02B 5/30
USPC ......................................................... 345/173
See application file for complete search history.

(56) References Cited

U.S. PATENT DOCUMENTS

| | | | | |
|---|---|---|---|---|
| 2011/0050657 | A1* | 3/2011 | Yamada | H01L 51/5237 345/204 |
| 2013/0021289 | A1* | 1/2013 | Chen | H01L 51/5253 345/174 |
| 2016/0202833 | A1* | 7/2016 | Kim | G06F 3/04164 345/173 |
| 2020/0033997 | A1* | 1/2020 | Wang | G06F 3/0443 |

FOREIGN PATENT DOCUMENTS

| | | |
|---|---|---|
| KR | 10-2012-0098471 A | 9/2012 |
| KR | 10-1365036 B1 | 2/2014 |
| KR | 20150046494 A * | 4/2015 |

* cited by examiner

*Primary Examiner* — Mark Edwards
(74) *Attorney, Agent, or Firm* — Sughrue Mion, PLLC (57) ABSTRACT

A touch sensor includes a base layer and a wiring formed in a display area among a vertex region of the base layer and made of a transparent or translucent material at least partially.

18 Claims, 8 Drawing Sheets

TOUCH SENSOR

CROSS REFERENCE TO RELATED APPLICATIONS

This application claims priority based on Korean Patent Application No. 10-2020-0036745, filed Mar. 26, 2020, the content of which is incorporated herein by reference in its entirety.

TECHNICAL FIELD

The present invention relates to a touch sensor. Specifically, the present invention relates to a touch sensor capable of solving a visibility problem caused by forming wiring in a vertex region in a so-called zero bezel smartphone.

BACKGROUND ART

A touch sensor of a smartphone or the like is a device that detects a touch signal. Touch sensors can be classified into a resistive type, a capacitive type, an ultrasonic type, an infrared type, and so on, according to the sensing method of a touch part. Recently, the capacitive type is mainly used.

The capacitive type uses a transparent substrate on which a conductive thin film is formed. When a user touches a surface of a coated transparent substrate with a certain amount of current flowing through the surface of the transparent substrate, the amount of current changes at the contact surface. The capacitive type can detect such a change in current to detect whether or not it is touched.

A touch sensor includes a plurality of sensing electrodes. The sensing electrodes may be classified into the first sensing electrodes connected in the X axis direction and the second sensing electrodes connected in the Y axis direction. The first and second sensing electrodes may be respectively connected to the first and second wiring portions. The first and second wiring portions may extend along the side margins of the transparent base layer to be connected to an electrode pad portion formed at the lower margin of the transparent base layer, that is, a bezel region. The electrode pad portion may be connected to a printed circuit board such as FPC, COF, TCP, or the like through an anisotropic conductive film (ACF) or the like.

Recently, smartphones have realized a so-called zero bezel structure that makes the display area up to the edge region. The zero-bezel smartphone is configured by bending the edge region rearward, and in this case, overlapping may occur in the vertex region. This overlapping of the vertex region is solved by cutting and removing a part of the vertex region to bend.

However, when the vertex region is cut off, the wiring portion moves inward, that is, to the display area. As a result, there is a problem that wiring typically made of a conductive metal are visually recognized during screen display.

DISCLOSURE OF INVENTION

Technical Problem

An object of the present invention is to prevent or minimize the visibility of wiring during screen display in a vertex region of a zero-bezel smartphone.

Technical Solution

A touch sensor of the present invention for achieving the above object may include a base layer and a wiring.

The wiring is formed in a display area among a vertex region of the base layer and may be made of a transparent or translucent material at least partially.

In the touch sensor of the present invention, the base layer may have a cutout part in the vertex region. The cutout part has a recessed part recessed inward. The cutout part is provided with a curved base portion having a curved margin at the center. The cutout part may be provided with a first and a second straight base portions having straight margins on both sides of the curved base portion.

In the touch sensor of the present invention, the wiring may include a first metal wiring, a second metal wiring, and a wiring bridge.

The first metal wiring is formed along a margin of at least a part of the first straight base portion and may include a conductive metal.

The second metal wiring is formed along a margin of at least a part of the second straight base portion and may include a conductive metal.

The wiring bridge is formed along a margin of at least the curved base portion to connect the first metal wiring and the second metal wiring. The wiring bridge may be made of a transparent or translucent material. The wiring bridge may be formed in the display area.

In the touch sensor of the present invention, the first and second metal wirings may be formed in a flat bending portion that is bent rearward to form a vertical plane among the first and second straight base portions. The wiring bridge may be formed in the curved base portion and a curved bending portion that is bent rearward to form a curved surface among the first and second straight base portions.

In the touch sensor of the present invention, the first and second metal wirings may be formed in the first and second straight base portions. The wiring bridge may be formed in the curved base portion.

In the touch sensor of the present invention, the wiring bridge may be an OMO (Oxide-Metal-Oxide) laminate.

In the touch sensor of the present invention, the wiring bridge may have a line width of 30 to 70 μm.

In the touch sensor of the present invention, the first and second metal wirings may include first and second transparent oxide wirings thereunder, respectively.

A laminate according to the present invention may include the touch sensor described above and a polarizing layer laminated on the touch sensor.

The laminate according to the present invention may further include a window laminated on one surface of the touch sensor or the polarizing layer.

The laminate according to the present invention may further include a decorative film laminated on one surface of the polarizing layer or the window.

Advantageous Effects

According to the present invention, by replacing metal wiring in a vertex region of a display area with a wiring bridge made of a transparent or translucent material, it is possible to prevent or minimize the visibility of the wiring in the vertex region of the display area.

In the present invention, a base layer may include a curved base portion and a straight base portion in the vertex region. In this case, the wiring bridge is formed on the curved base portion to minimize the length of the wiring bridge having a relatively higher resistance than the metal, thereby minimizing an increase in resistance due to replacement with the wiring bridge.

In addition, according to the present invention, by forming the wiring bridge in an area of the vertex region that is bent rearward to form a curved bending portion, an increase in resistance due to replacement with the wiring bridge can be minimized, and visibility prevention of the wiring can also be achieved.

BEST MODE

Hereinafter, the present invention will be described in detail with reference to the accompanying drawings.

Figure 1:
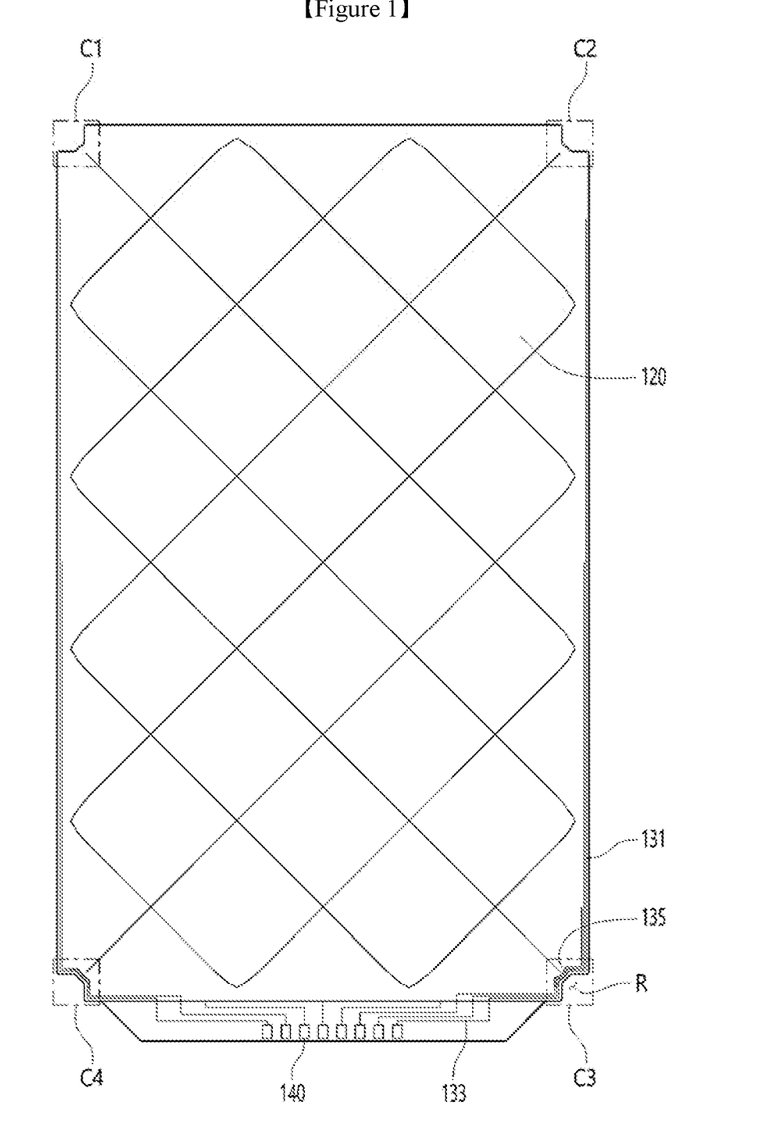
FIG. 1 is a plan view of a touch sensor according to the present invention.
Figure 2:
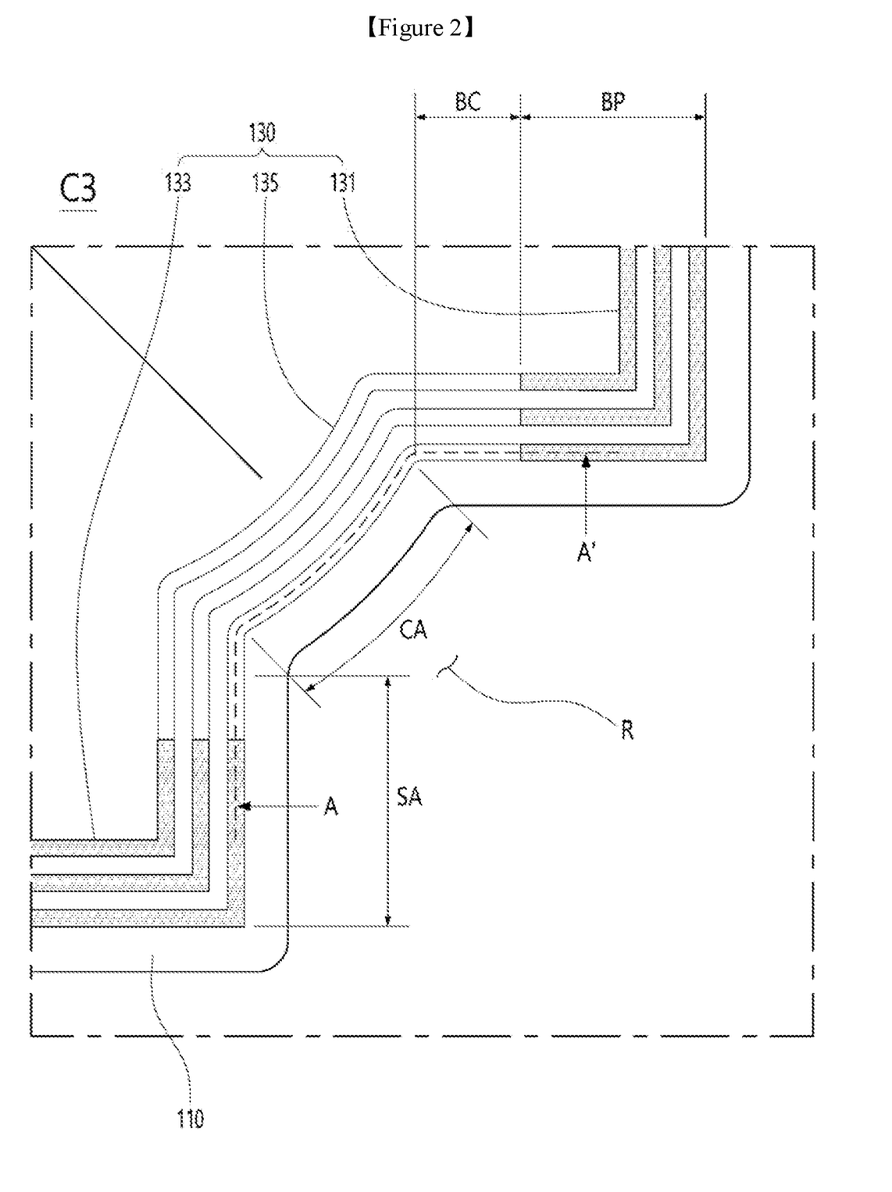
FIG. 2 is a partial enlarged view in which a vertex region in a touch sensor according to the present invention is enlarged.

FIG. 1 is a plan view of a touch sensor according to the present invention, and FIG. 2 is a partial enlarged view in which a vertex region in a touch sensor according to the present invention is enlarged.

As shown in FIGS. 1 and 2, the touch sensor of the present invention may be composed of a base layer 110, a sensing electrode portion 120, a wiring portion 130, an electrode pad portion 140, a passivation layer (not shown in FIGS. 1 and 2, 150 of FIG. 3A), and so on.

The base layer 110 is a base of the sensing electrode portion 120, the wiring portion 130, and the electrode pad portion 140. The base layer 110 may be composed of, for example, a cyclo-olefin polymer (COP), polycarbonate, polyethylene terephthalate (PET), polymethyl methacrylate, polyimide, polyethylene naphthalate, polyether sulfone, etc.

The base layer 110 may be a separation layer, a protective layer, or a laminate of a separation layer and a protective layer when the touch sensor is manufactured by a transfer method. The separation layer may be composed of an organic polymer film, for example, polyimide, poly vinyl alcohol, polyamic acid, polyamide, polyethylene, polystyrene, polynorbornene, etc. The protective layer may include at least one of an organic insulation layer or an inorganic insulation layer. The protective layer can be formed through coating/curing or deposition.

The base layer 110 may have cutout parts C1 to C4 at vertex regions. The cutout parts C1 to C4 may have recessed parts R recessed inward. The cutout parts C1 to C4 may have a curved base portion CA having a curved end at the center. The cutout parts C1 to C4 may have a straight base portion SA forming a straight line on both sides of the curved base portion CA.

The entire curved base portion CA may be included in a display area. When the curved base portion CA is bent rearward, it may be gradually bent to form a curved surface as a whole.

A part of the straight base portion SA may be included in the display area. When the straight base portion SA is bent rearward, the inner part is gradually bent to form a curved bending portion BC that forms an overall curved surface, and the remaining outer part is completely bent rearward to form a flat bending portion BP of a straight line shape.

The sensing electrode portion 120 is formed on the base layer 110 for sensing a touch, which may include a plurality of sensing electrodes.

It is preferable that the sensing electrode portion 120 has an electrode pattern structure used in a capacitive type. Either a mutual-capacitance type or a self-capacitance type may be employed. In the case of the mutual-capacitance type, it may be a grid pattern with a horizontal axis and a vertical axis. A bridge electrode may be included at an intersection of the electrodes of the horizontal and vertical axes. In the case of the self-capacitance type, it may have a pattern structure in which a change in capacitance is read using one electrode at each point.

The sensing electrode may be formed of a transparent conductive material. The transparent conductive material may be, for example, a metal oxide, a carbon nanotube, graphene, a conductive polymer, a conductive ink, or the like. As the metal oxide, indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), aluminum zinc oxide-silver-aluminum zinc oxide (AZO-Ag-AZO), etc. may be used.

When the sensing electrode is used for foldable devices, it may be preferable to be formed of a soft conductive material. As the soft conductive material, polyethylenedioxythiophene (PEDOT: poly 3,4-ethylenedioxythiophene), PEDOT:PSS (polystyrene sulfonate), or a mixture of PEDOT:PSS and metal nanowires may be used.

PEDOT:PSS is a polythiophene-based conductive polymer, which is poly(3,4-ethylenedioxythiophene) doped with polystyrene sulfonate (PSS). PEDOT:PSS can be prepared by oxidative polymerization of 3,4-ethylenedioxythiophene (EDOT) in an aqueous solution using PSS as a template for balancing charge. PEDOT:PSS allows PEDOT to be ionic bonded very strongly to the PSS polymer chain. As a result, PEDOT:PSS is not separated from each other in an aqueous solution and can be stably dispersed as polymer gel particles.

Metal nanowires consist of a conductive metal in the form of nano-unit wires. Metal nanowires may be, for example, silver (Ag), gold (Au), copper (Cu), nickel (Ni), platinum (Pt), palladium (Pd), or aluminum (Al) nanowires, or may be core-shell wires with a combination thereof. The nanowires can be connected to each other to act as electrodes. Nanowires can be transparent due to their nano-sized dimension.

The sensing electrode portion 120 may be formed in a bending area of the base layer 110, for example, the entire area of the curved base portion CA excluding the marginal area where the wiring portion 130 is formed and to the curved bending portion BC in the straight base portion SA excluding the marginal area where the wiring portion 130 is formed.

The wiring portion 130 transmits a touch signal sensed by the sensing electrode portion 120 to the electrode pad portion 140, and may be formed along the margin of the base layer 110.

The wiring portion 130 may be formed, in an edge region, in a flat bending portion BP in which the base layer 110 is completely bent rearward and forms a planar shape. The wiring portion 130 in the edge region may be made of a conductive metal such as nickel, cobalt, silver, copper, gold, and palladium.

The wiring portion 130 may be formed, in the vertex region, that is, the cutout portions C1 to C4, along the margin. The wiring portion 130 may include a first metal wiring 131, a wiring bridge 135, and a second metal wiring 133.

The first and second metal wirings 131 and 133 may be formed in the flat bending portion BP area of the straight base portion SA. In this configuration, when the base layer 110 is bent, the flat bending portion BP area is completely bent rearward. Accordingly, when viewed from the front, the first and second metal wirings 131 and 133 in the flat bending portion BP area appear in the form of dots. As a result, the first and second metal wirings 131 and 133 may not be easily recognized. Accordingly, the first and second metal wirings 131 and 133 may be formed of a conductive metal such as nickel, cobalt, silver, copper, gold, palladium, or the like as the wiring portion 130 in the edge region.

The wiring bridge 135 is a bridge connecting the first and second metal wirings 131 and 133, and can be formed in a part of the straight base portion SA, that is, in the curved bending portion BC area and the curved base portion CA area. The wiring bridge 135 is included in the display area as a whole when the base layer 110 is bent, and it forms a curved surface when it is bent rearward. As a result, the wiring bridge 135 may be visually recognized in the form of a line rather than a point. Therefore, the wiring bridge 135 is preferably made of a material having high transparency. Furthermore, the wiring bridge 135 is preferably made of a material capable of minimizing electrical resistance. In order to meet these conditions, a transparent or translucent conductive material may be used for the wiring bridge 135.

As the transparent conductive material, for example, a metal oxide, a carbon nanotube, graphene, a conductive polymer, a conductive ink, or the like can be used. As the metal oxide, indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), aluminum zinc oxide-silver-aluminum zinc oxide (AZO-Ag-AZO), etc. may be used.

As the translucent oxide, an OMO (Oxide-Metal-Oxide) laminate or the like may be used. The OMO laminate may include a first oxide layer, a conductive metal layer, a second oxide layer, and the like.

The first oxide layer may be formed of a metal oxide such as indium zinc oxide (IZO), indium tin oxide (ITO), aluminum zinc oxide (AZO), zinc oxide (ZnOx), titanium oxide (TiO2), aluminum oxide (Al2O3), and the like. The first oxide layer may be formed in a mesh pattern.

The conductive metal layer is formed on the first oxide layer, and may be formed of a conductive metal such as silver (Ag), copper (Cu), gold (Au), aluminum (Al), platinum (Pt), palladium (Pd), chromium (Cr), tungsten (W), titanium (Ti), tantalum (Ta), iron (Fe), cobalt (Co), nickel (Ni), zinc (Zn), telenium (Te), vanadium (V), niobium (Nb), molybdenum (Mo), and the like. The conductive metal layer may be formed of a mesh pattern.

The second oxide layer is formed on the conductive metal layer, and may be formed of a metal oxide in the same manner as the first oxide layer. The second oxide layer may have a mesh pattern.

The first oxide layer, the conductive metal layer, and the second oxide layer constituting the OMO laminate may be formed by thin film deposition techniques such as physical vapor deposition (PVD) and chemical vapor deposition (CVD). The mesh pattern may be formed using photolithography or the like.

The OMO laminate may have a transparency of 83% or more, a sheet resistance of 10 to 15Ω/□, and a line width of 30 to 70 μm.

In the above, it has been described that the first and second metal wirings 131 and 133 are not formed in the curved bending portion BC of the straight base portion SA. However, if the increase in resistance due to the addition of the wiring bridge 135 is a problem, the first and second metal wirings 131 and 133 can be formed in the entire area of the straight base portion SA, that is, the flat bending portion BP as well as the curved bending portion BC. In this case, it is possible to take the form of having the wiring bridge 135 only in the area of the curved base portion CA. At this time, although there is a concern that the first and second metal wirings 131 and 133 may be visually recognized in the curved bending portion BC, the increase in resistance due to the addition of the wire bridge 135 may be minimized.

The electrode pad portion 140 transmits the touch signal received through the wiring portion 130 to the outside, that is, to the printed circuit board, and it may be formed in a marginal area of the base layer 110, that is, a bezel region which is a non-display area.

The electrode pad portion 140 may include an electrode pad connected to the wiring portion 130 to transmit the touch signal and a dummy pad not connected to the wiring portion 130. The dummy pad may be of the same size as the electrode pad. It may have the same height with the smaller width and length, or the same height and width with the smaller length.

The passivation layer 150 (FIGS. 3A-3C) insulates and protects the sensing electrode portion 120 and the wiring portion 130, and may be formed on the sensing electrode portion 120, the wiring portion 130, and the base layer 110. The passivation layer 150 (FIGS. 3A-3C) may be formed to open the electrode pad portion 140 connected to the printed circuit board. The passivation layer 150 (FIGS. 3A-3C) may be composed of one or more materials selected from a curable prepolymer, a curable polymer, and a plastic polymer, which are general insulators.

The passivation layer 150 (FIGS. 3A-3C) may be made of a varnish-type material capable of forming a film. The varnish-type material may be polysilicon, such as polydimethylsiloxane (PDMS) or polyorganosiloxane (POS), polyimide, or polyurethane, such as spandex. The varnish-type material is a soft insulation material and can increase the stretchability and dynamic folding capability of the touch sensor.

Figure 3A:
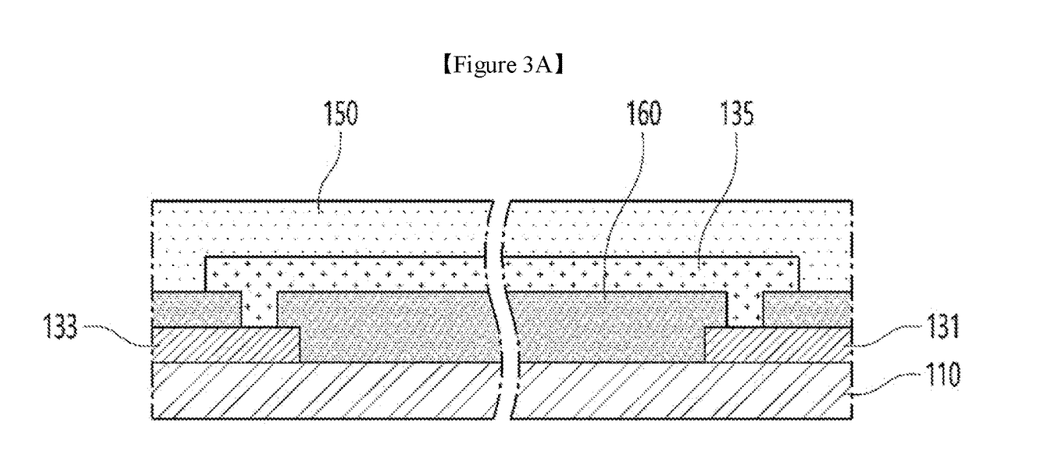
FIGS. 3A to 3C are cross-sectional views showing a wiring bridge connection structure of the first embodiment and modifications thereof in touch sensors according to the present invention.
Figure 3B:
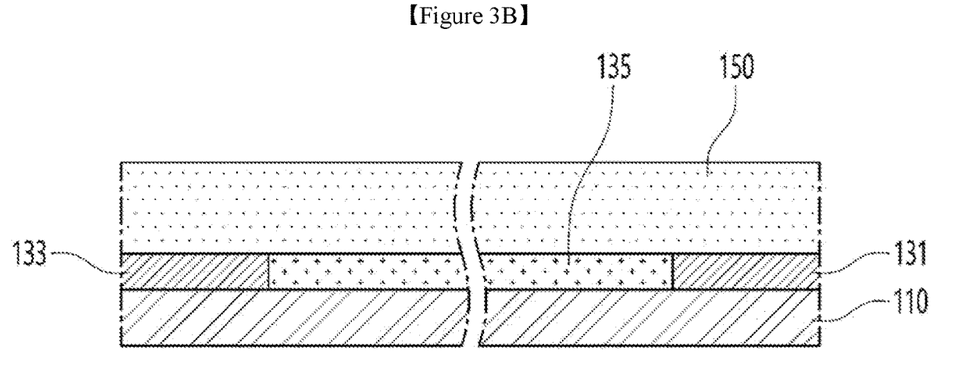
Figure 3C:
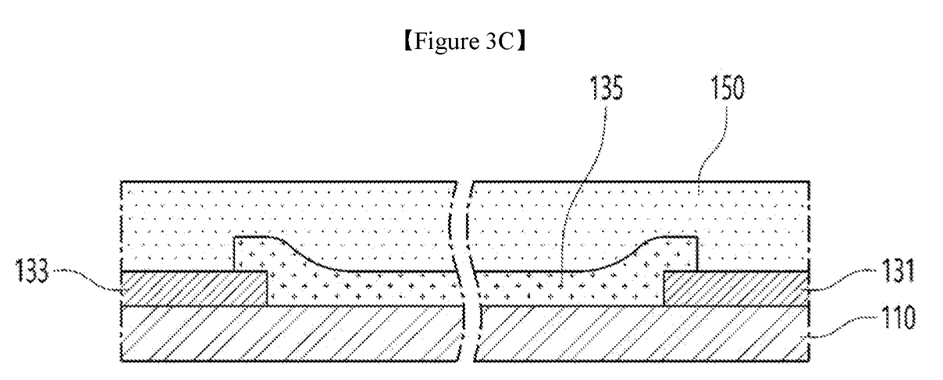

FIGS. 3A to 3C are cross-sectional views showing a wiring bridge connection structure of the first embodiment and modifications thereof in touch sensors according to the present invention.

As shown in the cross-sectional view of FIG. 3A taken along AA' of FIG. 2, the wiring bridge connection structure of the first embodiment takes the form of connecting the first metal wiring 131 and the second metal wiring 133 composed of only conductive metal with the wiring bridge 135 in the form of a bridge. In this case, the wiring bridge 135 is insulated by an insulation layer 160 and penetrates the insulation layer 160 above the first and second metal wirings 131 and 133 to connect the first metal wiring 131 and the second metal wiring 133.

The insulation layer 160 may be formed of one or more materials selected from a curable prepolymer, a curable polymer, and a plastic polymer, which are general insulators.

The passivation layer 150 may be formed on the wiring bridge 135 to protect the wiring bridge 135.

FIG. 3B is a modification of FIG. 3A, in which the wiring bridge 135 forms the same plane as the first and second metal wirings 131 and 133 and is side-coupled to the first and second metal wirings 131 and 133.

FIG. 3C is a modification of FIG. 3B, in which the wiring bridge 135 forms the same plane as the first and second metal wirings 131 and 133 and is coupled to the first and second metal wirings 131 and 133. However, in order to prevent connection failure at the connection part, it is extended to a part of the upper surface of the first and second metal wirings 131 and 133.

Figure 4A:
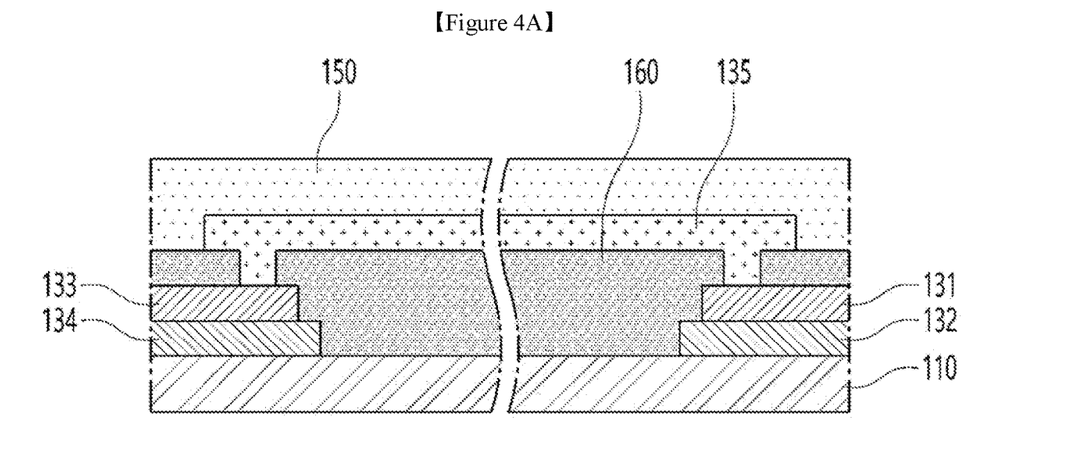
FIGS. 4A to 4C are cross-sectional views showing a wiring bridge connection structure of the second embodiment and modifications thereof in touch sensors according to the present invention.
Figure 4B:
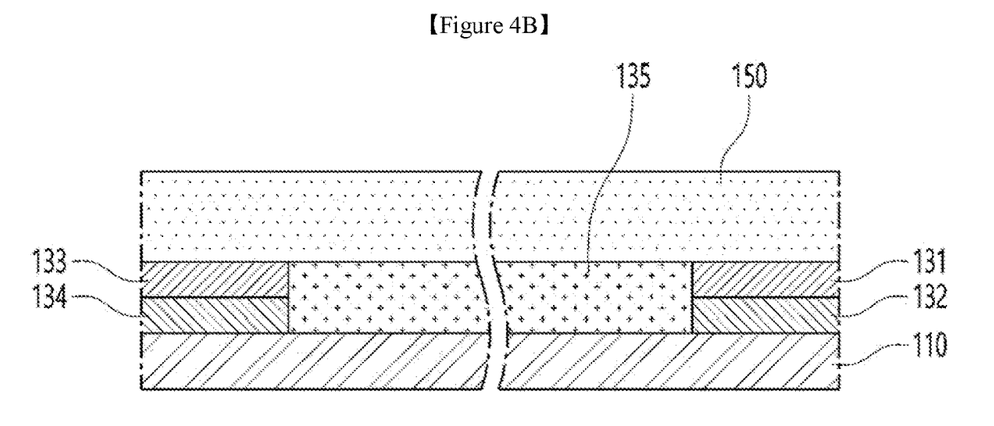
Figure 4C:
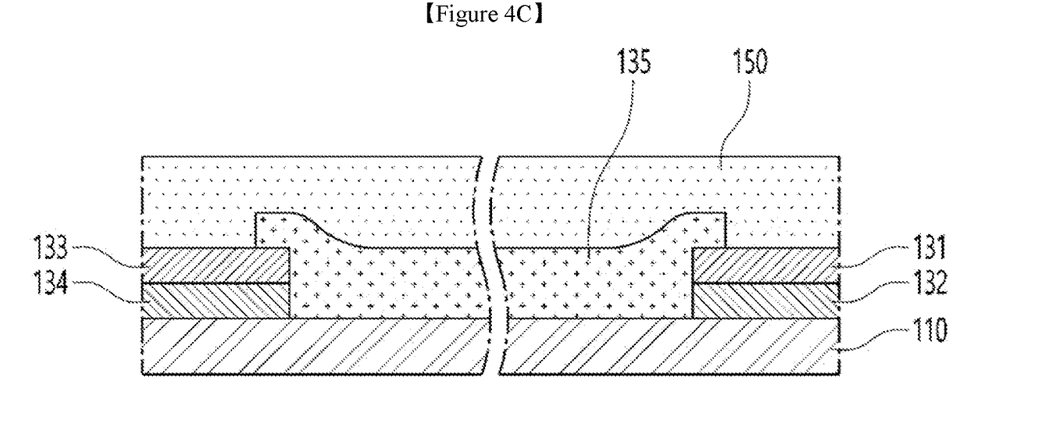

FIGS. 4A to 4C are cross-sectional views showing a wiring bridge connection structure of the second embodiment and modifications thereof in touch sensors according to the present invention.

As shown in FIGS. 4A to 4C, the wiring bridge connection structure of the second embodiment and its modifications take a structure to increase the transparency by adding first and second transparent oxide wirings 132 and 134 under first and second metal wirings 131 and 133.

Since the remaining configurations of FIGS. 4A to 4C are the same as the corresponding configurations of FIGS. 3A to 3C, detailed descriptions of the remaining configurations will be replaced with the related descriptions of FIGS. 3A to 3C.

The lamination structure of the wiring bridge shown in FIGS. 3A to 3C and 4A to 4C may be the same as the lamination structure of the sensing electrode portion 120 in the display area. Through this, it is possible to perform the formation of the wiring bridge 135 or the like in the forming process of the sensing electrode portion 120 together or to minimize the addition of the process, thereby reducing the process time and lowering the manufacturing cost.

The touch sensor according to the present invention may further include a functional layer (not shown). The functional layer (not shown) may be a transparent film, a polarizing layer, or the like. The transparent film may be an isotropic film, a retardation film, a protective film, or the like. As the polarizing layer, for example, those in which a protective layer is formed on at least one surface of a polarizer dyed with iodine or a dichroic dye by stretching a polyvinyl alcohol film, a liquid crystal aligned to have the performance of a polarizer, a transparent film coated with an oriented resin such as polyvinyl alcohol, and then stretched and dyed, or the like may be used.

A laminate according to the present invention may comprise the touch sensor described above and a polarizing layer laminated on the touch sensor.

The laminate according to the present invention may further comprise a window laminated on one surface of the touch sensor or the polarizing layer.

The laminate according to the present invention may further comprise a decorative film laminated on one surface of the polarizing layer or the window.

The preferred embodiments of the present invention have been described with reference to the drawings. However, the present invention is not limited to the above-described embodiment, and it will be understood that the present invention can be implemented in a modified form without departing from the essential characteristics of the present invention. Therefore, the scope of the present invention is defined by the claims rather than the foregoing description, and all differences within the equivalent range should be interpreted as being included in the present invention.

DESCRIPTION OF REFERENCE NUMERALS

110: base layer
120: sensing electrode portion
130: wiring portion
131: first metal wiring
132: first transparent oxide wiring
133: second metal wiring
134: second transparent oxide wiring
135: wiring bridge
140: electrode pad portion
150: passivation layer
160: insulation layer
C1-C4: cutout part
R: recessed part
SA: straight base portion
CA: curved base portion
BC: curved bending portion
BP: flat bending portion

The invention claimed is:

1. A touch sensor comprising:
a base layer; and
a wiring formed in a display area among a vertex region of the base layer and made of a transparent or translucent material at least partially,
wherein the base layer has a cutout part in the vertex region, the cutout part having a recessed part recessed inward and being provided with a curved base portion having a curved margin at the center and a first and a second straight base portions having straight margins on both sides of the curved base portion, and
the wiring includes:
a first metal wiring formed along a margin of at least a part of the first straight base portion and including a conductive metal;
a second metal wiring formed along a margin of at least a part of the second straight base portion and including a conductive metal; and
a wiring bridge formed along a margin of at least the curved base portion to connect the first metal wiring and the second metal wiring, made of a transparent or translucent material, and formed in the display area.

2. The touch sensor according to claim 1, wherein the first and second metal wirings are formed in a flat bending portion that is bent rearward to form a vertical plane among the first and second straight base portions, and
the wiring bridge is formed in the curved base portion and a curved bending portion that is bent rearward to form a curved surface among the first and second straight base portions.

3. The touch sensor according to claim 1, wherein the first and second metal wirings are formed in the first and second straight base portions, and
the wiring bridge is formed in the curved base portion.

4. The touch sensor according to claim 1, wherein the wiring bridge is an OMO (Oxide-Metal-Oxide) laminate.

5. The touch sensor according to claim 4, wherein the wiring bridge has a line width of 30 to 70 μm.

6. The touch sensor according to claim 1, wherein the first and second metal wirings include first and second transparent oxide wirings thereunder, respectively.

7. A laminate comprising:
the touch sensor according to claim 1; and
a polarizing layer laminated on the touch sensor.

8. The laminate according to claim 7, further comprising a window laminated on one surface of the touch sensor or the polarizing layer.

9. The laminate according to claim 8, further comprising a decorative film laminated on one surface of the polarizing layer or the window.

10. The touch sensor according to claim 2, wherein the wiring bridge is an OMO (Oxide-Metal-Oxide) laminate.

11. The touch sensor according to claim 10, wherein the wiring bridge has a line width of 30 to 70 μm.

12. The touch sensor according to claim 3, wherein the wiring bridge is an OMO (Oxide-Metal-Oxide) laminate.

13. The touch sensor according to claim 12, wherein the wiring bridge has a line width of 30 to 70 μm.

14. The touch sensor according to claim 2, wherein the first and second metal wirings include first and second transparent oxide wirings thereunder, respectively.

15. The touch sensor according to claim 3, wherein the first and second metal wirings include first and second transparent oxide wirings thereunder, respectively.

16. A laminate comprising:
the touch sensor according to claim 1; and
a polarizing layer laminated on the touch sensor.

17. A laminate comprising:
the touch sensor according to claim 2; and
a polarizing layer laminated on the touch sensor.

18. A laminate comprising:
the touch sensor according to claim 3; and
a polarizing layer laminated on the touch sensor.

\* \* \* \* \*